United States Patent [19]

Rubi

[11] Patent Number: 5,488,406
[45] Date of Patent: Jan. 30, 1996

[54] METHOD AND APPARATUS FOR THE EXPOSING OF LIGHT-SENSITIVE MATERIAL TO BE EXPOSED

[75] Inventor: Horst Rubi, Kassel-Baunatal, Germany

[73] Assignee: Scangraphic PrePress Technology GmbH, Wedel, Germany

[21] Appl. No.: 65,606

[22] Filed: May 21, 1993

[30] Foreign Application Priority Data

May 21, 1992 [DE] Germany ............... 42 17 238.1

[51] Int. Cl.$^6$ ............................................ B41J 2/47
[52] U.S. Cl. ................................... 347/259; 347/134
[58] Field of Search ........................ 347/259, 260, 347/262, 256, 134

[56] References Cited

U.S. PATENT DOCUMENTS

| | | |
|---|---|---|
| 1,857,130 | 5/1932 | Alexanderson . |
| 3,475,553 | 10/1969 | Reese et al. . |
| 3,656,828 | 4/1972 | Scholdstrom . |
| 4,260,997 | 4/1981 | Fukui ........................... 346/138 |
| 4,684,228 | 8/1987 | Holthusen ..................... 347/259 |
| 5,114,217 | 5/1992 | Beiser . |

FOREIGN PATENT DOCUMENTS

| | | |
|---|---|---|
| 0209834A2 | 1/1987 | European Pat. Off. . |
| 0126469 | 3/1990 | European Pat. Off. . |
| 0217136B1 | 10/1991 | European Pat. Off. . |
| 0154852 | 4/1982 | German Dem. Rep. . |
| 3531458 | 3/1987 | Germany . |

OTHER PUBLICATIONS

Publication: "Quantum Electronics" by Amnon Yariv, publishers John Wiley and Sons. Inc. New York 1967, chapter 19, pp. 310 through 327.

*Primary Examiner*—Mark J. Reinhart
*Attorney, Agent, or Firm*—Horst M. Kasper

[57] ABSTRACT

A method for the exposure of photo-sensitive material to be exposed (1) is performed inside of a casing (2) sealed against light from an external light source. The material to be exposed (1) is placed in a circular arc-shaped plane (3) having a uniform distance to a center longitudinal axis (4). Laser light beams (10), derived from the laser beam (6) of a laser generator (5) and deflected with a rotatable mirror (9), are providing exposure spots on the material to be exposed (1) with point-shaped signals. The recording speed is doubled or, respectively, an image or text composition is processed in half the time previously required by deflecting the light beams (10), exiting in parallel to an axis from the collimator (8), onto at least two mirror faces (12a and 12b), disposed at an angle (11) relative to the center median axis (4). Thereupon, the reflected parallel light beams (20) are focused in an optical system (13) and the light beams (15, 16) are then directed radially onto the focusing plane (14) of the rotary and circulating surface (1a) of the material to be exposed (1).

23 Claims, 5 Drawing Sheets

METHOD AND APPARATUS FOR THE EXPOSING OF LIGHT-SENSITIVE MATERIAL TO BE EXPOSED

BACKGROUND OF THE INVENTION

1. Field of the Invention

The invention relates to a method and a device for the exposing of light-sensitive material to be exposed within a casing closed off to light.

2. Brief Description of the Background of the Invention Including Prior Art

Such a casing requires at least an entrance and/or exit slot, such that the strip-shaped material to be exposed can be inserted and removed again through the same slot, as taught in the German Democratic Republic Printed Patent Document DD-0-154852, or through an entrance, formed by roller pairs in the interior on one side of the light-sealed casing, and a similarly formed exit on another side of a circular cylinder segment shaped apparatus for the strip-shaped material to be exposed according to European Patent EP-0,126,469 B1.

In principle, the path-shaped or strip-shaped material to be exposed is brought into a circular arc-shaped plane at a precisely uniform distance to a center median axis or to a midline. The known method operates in the way that a laser generates a laser beam, wherein the laser beam is deflected through a laser modulator into a collimator. Upon exiting the collimator, the laser beam is directed toward a rotating mirror, wherein the mirror is disposed at an angle relative to the center median axis and, from there, the laser beam is thrown, in the form of and shaped as point-like signals for providing exposure spots onto the material to be exposed.

In principle, this method has been useful, because a high resolution of a picture or text representation can be brought within a relatively short time onto the material to be exposed. The known device is suitable according to the apparatus technology to process the material to be exposed in track-shape such that upon insertion of a strip, following to the strip which has been exposed, there can be achieved a very high degree of automatic operation. However, disadvantages occur in the context of this method in that case, where the number of the exposure spots to be transferred increases, and where in case of very memory-storage-intensive images or textual material the illumination and exposure require a time duration, which could be subject to criticism by the user of the illuminating and exposure devices.

The German Printed Patent Document D-OS 3531458 A1 to Bernd Holthusen teaches a photo-composition apparatus. The composition apparatus of the reference operates with rotating mirror impinged by a modulated laser beam, where the rotating mirror is disposed on a slider and supported at a traverse.

The Scholdstrom U.S. Pat. No. 3,656,828 teaches a light signal apparatus. A pair of oppositely directed beams of light are rotated about an axis. However, the reference does not show the use of the rotating light beam in connection with a photo-composition apparatus.

The Beiser U.S. Pat. No. 5,114,217 teaches a double-reflection light scanner. A light source is provided for generating an input light beam and a rotatable apparatus support is provided and has an axis of rotation that is substantially parallel to the input light beam. Reflectors are provided for deflecting the light. However, this reference does not provide for a photo-composition apparatus structure.

SUMMARY OF THE INVENTION

1. Purposes of the Invention

It is an object of the present invention to provide a quicker transfer of signals for achieving an increased resolution of an image, i.in case of very high pixel numbers, such that high recording speeds can be obtained.

It is another object of the present invention to increase the number of exposure spots without requiring a complete duplication of equipment.

It is yet a further object of the present invention to provide an exposure apparatus for material to be exposed which provides increased processing speed.

These and other objects and advantages of the present invention will become evident from the description which follows.

2. Brief Description of the Invention

According to the present invention, there is provided for a method for exposing a photo-sensitive material to be exposed. The photosensitive material to be exposed is placed into a casing defining an inner circular arc-shaped cylinder and sealed against entry of light from external light sources. The material to be exposed is disposed in the circular arc-shaped cylinder and is thereby disposed at a uniform spacing from a center longitudinal axis of the arc-shaped cylinder. A laser beam is generated with a laser generator. The laser beam is modulated in a laser modulator. The modulated laser beam is reflected into a collimator. The collimated laser beam, aligned parallel to the center longitudinal axis, is directed onto a rotatable mirror having two mirror faces. Each one of the two mirror faces is disposed at an angle relative to the center longitudinal axis. A laser beam reflected on one of the mirror faces is focused with an optical system. The focused laser beam is directed radially onto a focusing surface, where focal points of the reflected and focused laser beam are rotary circulating on the surface of the material to be exposed. The material to be exposed is exposed with signals, providing point-shaped exposure spots on the material to be exposed, with the laser beam coming from the rotatable mirror and from the optical system.

The parallel aligned light beams, derived from the collimator, can be directed onto a respective one of the two mirror faces. The two mirror faces can be positioned at an angle of substantially 45 degrees relative to the center longitudinal axis. One of the two mirror faces can form an angle of 90 degrees relative to a second one of the two mirror faces.

A first radial exposure beam, derived from a first mirror face of the two mirror faces, can expose the arc-segment shaped material to be exposed along a first partial circumference covering an angle of 180 degrees. A second radial exposure beam, derived from a second mirror face of the two mirror faces, can expose the arc-segment shaped material to be exposed along a second circumference covering an angle of 180 degrees. Thereby the arc-segment shaped material to be exposed on the first partial circumference can be exposed staggered by a fixed track distance relative to the arc-segment shaped material to be exposed on the second partial circumference.

Alternatively, the collimated laser beam, aligned parallel to the center longitudinal axis, is directed onto a rotating beam splitting, deflecting and focusing structure for directing a first split, reflected and focused laser beam radially onto a focusing surface. A focal point of the first split, reflected and focused laser beam is rotary circulating on the surface of the material to be exposed and for directing a second split, reflected and focused laser beam radially onto the focusing surface. A focal point of the second split, reflected and focused laser beam is rotary circulating on the surface of the material to be exposed. The material to be exposed with signals providing point-shaped exposure spots is exposed on the material to be exposed with the first split, reflected and focused laser beam and with the second split, reflected and focused laser beam.

The rotating beam splitting, deflecting and focusing structure can be provided by two rotatable mirror faces. Each one of the two mirror faces can be disposed at an angle relative to the center longitudinal axis. The collimated laser beam can be reflected into a first reflected laser beam and a second reflected laser beam. The first reflected laser beam can be focused with a first optical system. The second reflected laser beam can be focused with a second optical system.

The rotating beam splitting, deflecting and focusing structure can be provided by a first rotatable mirror face having a substantially parabolic surface and by a second rotatable mirror face having a substantially parabolic surface. The first mirror face can be disposed such that a first part of the collimated laser beam is reflected into a first reflected laser beam. The second parabolic mirror face can be disposed such that a second part of the collimated laser beam is reflected into a second reflected laser beam. The first reflected laser beam can be focused based on the parabolic surface onto the material to be exposed. The second reflected laser beam can be focused based on the parabolic surface onto the material to be exposed.

The rotating beam splitting, deflecting and focusing structure can be provided by a rotatable semipermeable mirror. A face of the semipermeable mirror can be disposed at an angle relative to the center longitudinal axis. The collimated laser beam can be reflected by the semipermeable mirror into a first reflected laser beam. A laser beam passed through by the semipermeable mirror can be reflected by a planar mirror back to the semipermeable mirror. The semipermeable mirror reflects a substantial part of this back-reflected laser beam into a direction substantially opposite to that of the first reflected laser beam and thereby forms a second reflected laser beam. The first reflected laser beam can be focused with a first optical system. The second reflected laser beam can be focused with a second optical system.

The invention method is carried out with a photocomposition apparatus. A casing has an inner space defining a circular arc of a cylinder and a center longitudinal axis of the cylinder such that a photo-sensitive material to be exposed is positionable in said inner space to be exposed with a laser beam. Said casing is sealed against external light. A slider is slidable in direction of the center longitudinal axis. A laser generator is supported by the cylinder. The optical axis of the laser generator coincides with the center longitudinal axis. A laser modulator is disposed in a path of a laser beam generated by the laser generator for modulating the generated laser beam. A collimator is disposed in a path of the modulated laser beam for collimating the laser beam into a parallel beam. A rotatable mirror with two mirror faces is disposed in a path of the collimated laser beam for forming a first reflected laser beam and for forming a second reflected laser beam. A first focusing optical system, aligned parallel to a reflection direction of the first reflected laser beam, is disposed at a predetermined radial distance from the center longitudinal axis and allows adjustment of a focusing point to a surface of the material to be exposed for forming a first radial exposure beam to be directed and focused onto the material to be exposed in the form of point-shaped signals for generating exposed spots on the material to be exposed. A second focusing optical system, aligned parallel to a reflection direction of the second reflected laser beam, is disposed at a predetermined radial distance from the center longitudinal axis and allows adjustment of a focusing point to a surface of the material to be exposed for forming a second radial exposure beam to be directed and focused onto the material to be exposed in the form of point-shaped signals for generating exposed spots on the material to be exposed.

Each of the two mirror faces can form an angle of substantially 45 degrees relative to the center longitudinal axis. The two mirror faces are staggered by an angle of substantially 180 degrees around the circumference.

The rotatable mirror, furnished with the two mirror faces, can be connected to a support. The support can form outer rings for receiving the first focusing optical system and the second focusing optical system, focusing each in a radial direction. The first focusing optical system and the second focusing optical system can be disposed at equal-sized distances from the center longitudinal axis.

Preferably, the outer rings of the support, and thereby the first focusing optical system and the second focusing optical system, are slidable and adjustable, respectively, relative to each other without play in a micrometer region in a direction parallel to the center longitudinal axis.

Alternatively, a rotating beam splitting, reflecting and focusing means is provided for forming a first radial exposure beam to be directed and focused onto the material to be exposed in the form of point-shaped signals for generating exposed spots on the material to be exposed, and for forming a second radial exposure beam to be directed and focused onto the material to be exposed in the form of point-shaped signals for generating exposed spots on the material to be exposed.

The rotating beam splitting, reflecting and focusing means can be furnished by a rotatable mirror with two mirror faces disposed in a path of the collimated laser beam for forming a first reflected laser beam and for forming a second reflected laser beam. A first focusing optical system, aligned parallel to a reflection direction of the first reflected laser beam, can be disposed at a predetermined radial distance from the center longitudinal axis and allowing adjustment of a focusing point to a surface of the material to be exposed. A second focusing optical system, aligned parallel to a reflection direction of the second reflected laser beam, can be disposed at a predetermined radial distance from the center longitudinal axis and allowing adjustment of a focusing point to a surface of the material to be exposed.

Alternatively, the rotating beam splitting, reflecting and focusing means can be furnished by a rotatable mirror with two mirror faces each having a parabolic surface and each disposed in a path of the collimated laser beam for forming a first reflected and focused laser beam and for forming a second reflected and focused laser beam and for allowing adjustment of the two mirror faces individually to a respective focusing point on a surface of the material to be exposed.

Furthermore, the rotating beam splitting, reflecting and focusing means can be furnished by a rotatable semipermeable mirror disposed in a path of the collimated laser beam for forming a first reflected laser beam and for forming a transmitted laser beam. A planar mirror can be reflecting the transmitted laser beam in a direction opposite to that of the transmitted laser beam for being reflected at the rotatable semipermeable mirror and thereby for forming a second reflected laser beam. A first focusing optical system, aligned parallel to a reflection direction of the first reflected laser beam, can be disposed at a predetermined radial distance from the center longitudinal axis and allow adjustment of a focusing point to a surface of the material to be exposed. A second focusing optical system, aligned parallel to a reflection direction of the second reflected laser beam, can be disposed at a predetermined radial distance from the center longitudinal axis and allow adjustment of a focusing point to a surface of the material to be exposed.

The advantages obtained, according to the present invention, include in particular that a doubling of the number of the light beams, transferring the spots exposed, is achieved which either cuts the exposure time in half or which allows in the same time period to process the pictures, the images or the textual material at twice as high a resolution.

A particularly high transfer accuracy is achieved by directing the parallel light beams of the collimator onto mirror faces which are disposed at an angle of 45 degrees relative to a center longitudinal axis and where the incoming light beam and the outgoing light beam form an angle of 90 degrees relative to each other.

The first radial beam for exposure of a first mirror face is impinged on a partial periphery of an arc-segment-shaped material to be exposed of about 180 degrees, and the second radial beam for exposure of a second mirror face is impinged also onto the partial periphery of the arc-segment-shaped material to be exposed, shifted about 180 degrees, and the second radial beam for exposure exposes the material to be exposed staggered by a fixed track distance relative to positions exposed by the first radial beam for exposure. In this context, the advantage is achieved for the first time to illuminate and expose a full two times 180 degrees of an arc-shaped material to be exposed, while a deduction for the entrance opening width or the exit opening width has always to be made from the 360 degrees of the exposure drum such that previously the peripheral circumference of 360 degrees=2 times 180 degrees could not be reached.

The invention apparatus is a photo composition apparatus, where a photo-sensitive material to be exposed can be illuminated with a laser beam in the arc-shaped light-sealed inner space of the photo composition. This apparatus includes a slider, which can be slid in the direction of the center longitudinal axis stepwise or continuously and which supports a laser. The optical axis of the laser coincides with the center longitudinal axis. The generated laser beam is modulated in a laser modulator and is deflected through a collimator, which expands the light beams, with a corresponding beam distribution onto a rotatable mirror. A radial, focused irradiation and exposure beam, directed onto the material to be exposed, emanates from the mirror in the form of point-like signals as exposure spots, which generate the recited pixels.

This device is now further developed such that a rotatable mirror with at least two mirror faces is disposed in the path of the beam following to the collimator. A focusing optical system is furnished on the reflection axis of each mirror face and is disposed in radial distance to the center longitudinal axis. The focusing point of the collimator is in each case adjustable onto the surface of the material to be exposed. Successively following light rays are thereby generated. The light rays can expose in each case both a 180 degree arc of the material to be exposed or, alternatively, a 360 degree arc of the material to be exposed, i.e. the interior of a drum. However, it is also possible to expose smaller arc segments of less than 180 degrees.

Such a cooperation of the two illuminating and exposing beams is in particular additionally further enhanced by having each of the mirror faces of the rotatable mirror form an angle of 45 degrees relative to the center longitudinal axis. The two mirror faces are staggered at the circumference by an angle of 180 degrees.

Further advantages for the tuning of the two exposure beams result from having the rotatable mirror furnished with several mirror faces and connected to a support. The support forms the outer rings for the receiving of focusing optical systems. The focusing optical systems have equal radial distances from each other.

A particular advantage of the present invention is associated with having the outer rings of the support, and thus the focusing optical systems, constructed slidable or, respectively, adjustable without play as measured in the micrometer region in a direction parallel to the center longitudinal axis in an axial direction relative to each other. The distance of the two illuminating rays as a track on the material to be exposed is thus dependent only on the advance of the slider supporting the laser beam generator.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Other characteristics and advantages of the invention are set forth in the description which follows below and in the annexed drawings, in which.

DESCRIPTION OF INVENTION AND PREFERRED EMBODIMENT

Figure 1:
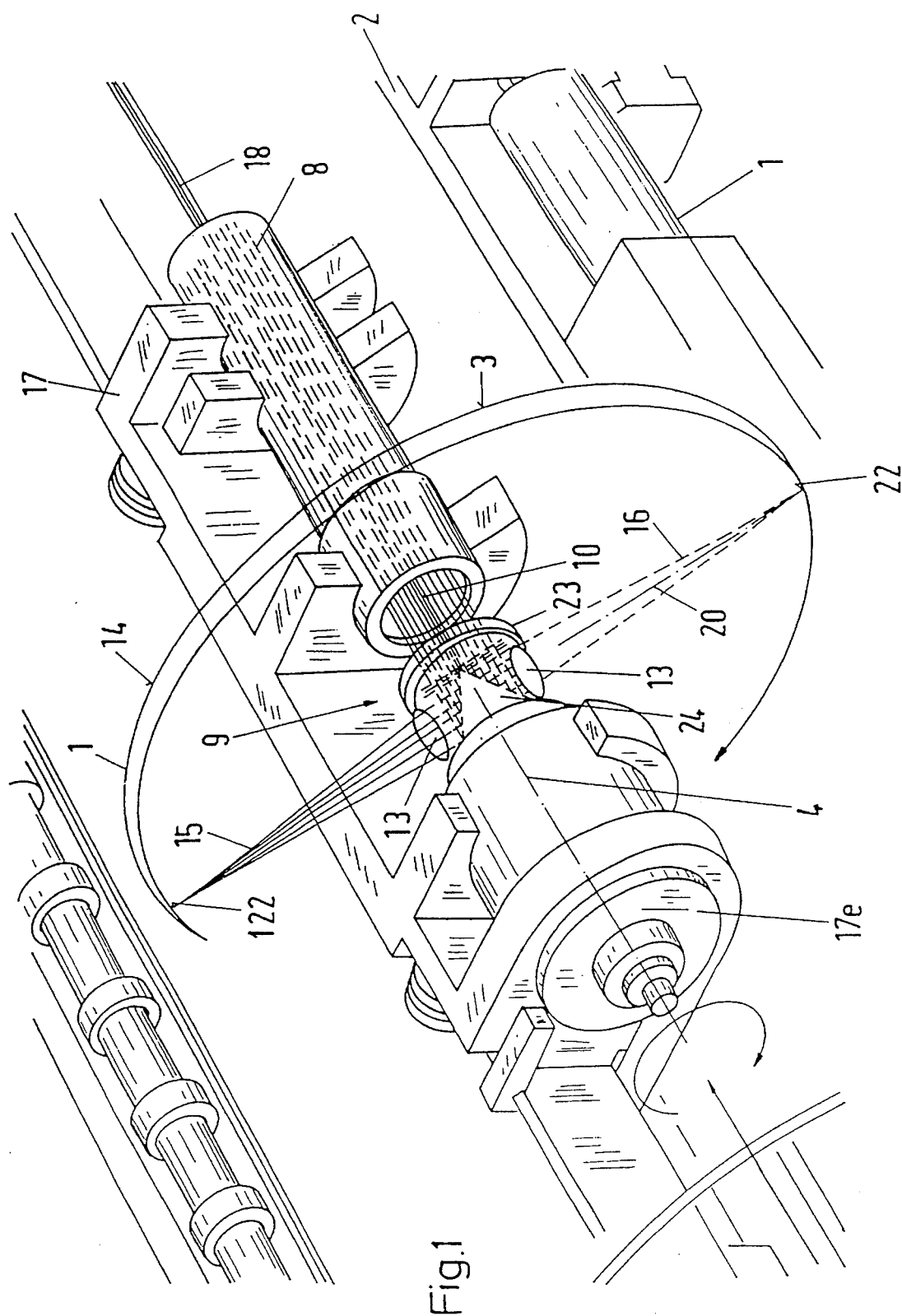
FIG. 1 is a perspective view of an interior of a casing, without the casing.

According to the present invention, there is provided for a method for exposing a photo-sensitive material to be exposed 1 within a casing 2 sealed against entry of light from external light sources. The material to be exposed 1 is disposed in a circular arc-shaped cylinder 3 disposed at a uniform spacing from a center longitudinal axis 4. A laser generator 5 generates a laser beam 6. The laser beam 6 is modulated through a laser modulator 7 and deflected into a collimator 8 and is directed onto a rotatable mirror 9 after exiting from the collimator 8. The rotatable mirror 9 is disposed at an angle relative to the central longitudinal axis 4. The laser beam 6 coming from the rotatable mirror exposes signals providing point-shaped exposure spots on the material to be exposed 1. The light beams 10, exiting aligned parallel to the center longitudinal axis 4 from the collimator 8, are deflected onto at least two mirror faces 12a, 12b, disposed at an angle 11 relative to the center longitudinal axis 4. The parallel light beams 10, reflected onto the mirror faces 12a, 12b, are then the reflected light beams 20 focused in a respective optical system 13 and are directed radially onto the focusing plane 14, where the focal points of the reflected parallel beams are rotary circulating on the surface 1a of the material to be exposed 1.

The parallel aligned light beams 10 of the collimator 8 can be directed onto the mirror faces 12a, 12b. Said mirror faces can be arranged at an angle 11 of 45 degrees relative to the center longitudinal axis 4. The mirror faces 12a, 12b can form an angle of 90 degrees relative to each other.

A first radial exposure beam 15 of the first mirror face 12a can expose the arc-segment shaped material to be exposed 1 along a first partial circumference covering an angle of 180 degrees. A second radial exposure beam 16 of the second mirror face 12b can also expose the arc-segment shaped material to be exposed 1 along a second circumference covering an angle of 180 degrees. Thereby the arc-segment shaped material to be exposed 1 on the first partial circumferences can be exposed staggered by a fixed track distance relative to the arc-segment shaped material to be exposed on the second partial circumference.

The method of the present invention is performed with a photocomposition apparatus. An inner space of the photocomposition apparatus is shaped like a circular arc and sealed against light. A photo-sensitive material to be exposed 1 is exposed in said inner space with a laser beam 6. A slider 17, slidable in direction of the center longitudinal axis 4, can support a laser generator 5. The optical axis 18 of the laser generator 5 coincides with the center longitudinal axis 4. The generated laser beam 6 is modulated in a laser modulator 7. The laser beam 6 is passed through a collimator 8 onto a rotatable mirror 9. A radial exposure beam, directed focused onto the material to be exposed 1, emanates from the rotatable mirror 9 in the form of point-shaped signals as exposure spots. A rotatable mirror 9 with at least two mirror faces 12a, 12b is disposed in the beam path 19 following to the collimator 8. A focusing optical system 13 is aligned parallel to the reflection direction of the reflected light beam 20 of the respective mirror face 12a, 12b disposed at a predetermined radial distance 21 from the center longitudinal axis 4. The focusing point 22 in each case is adjustable to the surface level 1a of the material to be exposed 1.

Each of the mirror faces 12a, 12b can form an angle 11 of 45 degrees relative to the center longitudinal axis 4. The two mirror faces 12a, 12b can be staggered by an angle of 180 degrees along the circumference.

The rotatable mirror 9, furnished with several mirror faces 12a, 12b, can be connected to a support 23. The support 23 can form outer rings 24, 25 for receiving the radially focusing optical systems 13. The focusing optical systems can be disposed at equal-sized distances from the center longitudinal axis 4.

Preferably, the outer rings 24, 25 of the support 23 and thereby the focusing optical systems 13 are slidable and adjustable, respectively, relative to each other without play in a micrometer region in a direction parallel to the center longitudinal axis 4.

The present invention provides a method for the exposure of photo-sensitive material to be exposed 1, which can be comprised of tracks, plates, strips, sheets or the like, where the exposure occurs within a casing 2 sealed against light entry from external sources. The material to be exposed 1, for example, a film strip, is resting in a circular arc-shaped plane 3 with precisely uniform remaining distance relative to a central longitudinal axis or median axis 4. The material to be exposed 1, for example, a film strip, is resting in a circular arc-shaped cylinder 3 with precisely uniform remaining distance relative to a central longitudinal axis or median axis 4. The uniform remaining distance is assured by having no air bubbles, hollow spaces or the like, present below the material to be exposed 1 toward the inner cylinder wall where the material employed to be exposed 1 is a flexible material.

During the process, a laser generator 5 generates a laser beam 6, where the laser beam 6 is modulated through a laser modulator 7, where the laser modulator 7 modulates the laser beam 6, i.e. the laser light is brought into a desired wave-shape. In the following, the laser light is deflected by a reflection system into a collimator 8 and is directed onto a rotating mirror 9 upon exiting out of the collimator 8. The rotating mirror 9 is in principle disposed at an angle relative to the center longitudinal axis 4. A laser light beam 10, transmitting the signals, exposes the material to be exposed 1 in the form of point-shaped signals as exposure spots having a diameter value in the order of magnitude of a few microns.

Figure 2:
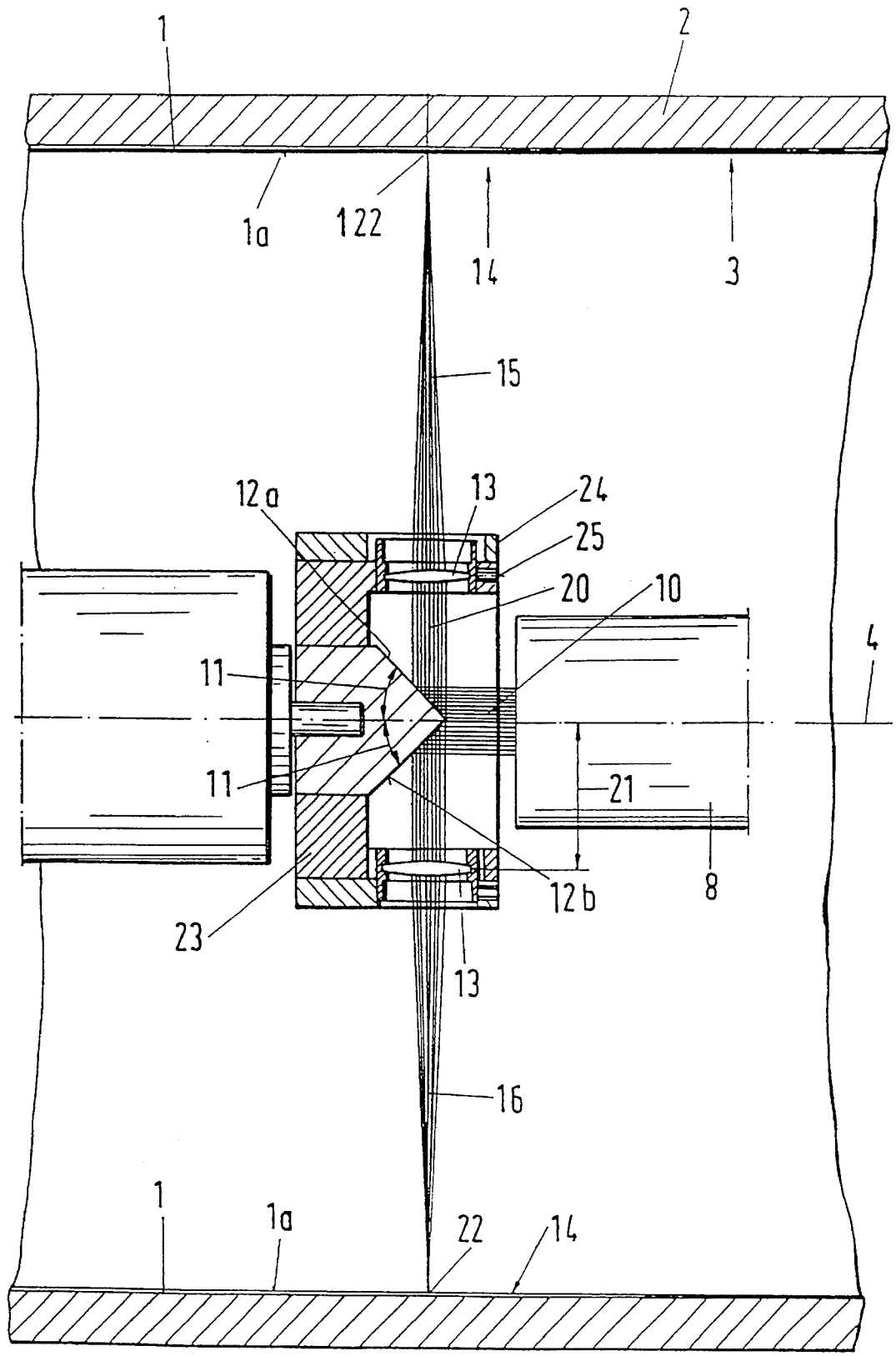
FIG. 2 is an axial longitudinal sectional view through a circular arc-shaped casing with an inserted material to be exposed.

According to the present invention, the laser light beams 10, exiting parallel to the axis out of the collimator 8, are deflected onto two mirror faces 12a and 12b, as shown in FIG. 2, disposed at an angle 11 relative to the center longitudinal axis 4. Then, the parallel laser light beams 10 are focused in an optical collector system 13 and are radially thrown onto a focusing plane 14 of the material surface to be exposed 1a while the two mirror faces 12a and 12b are circulating and rotating. The parallel light beams 10 of the collimator 8 fall in this case onto the mirror faces 12a and 12b. The mirror faces 12a and 12b are disposed at an angle 11 of in each case 45 degrees relative to the center longitudinal axis 4 and the mirror faces 12a and 12b form an angle of 90 degrees relative to each other, i.e. the planes of the mirror faces 12a and 12b are disposed perpendicular relative to each other.

The method can now be performed such that a first exposure laser beam 15 is reflected by a first mirror face 12a and impinges on and exposes the partial circumference of an arc segment-shaped material to be exposed 1 of 180 degrees cylinder coverage, and wherein a radial second exposure laser beam 16 of the second mirror face 12b also impinges on and exposes the same partial circumference of the arc segment-shaped material to be exposed 1 of 180 degrees cylinder coverage. The second exposure laser beam can expose the arc segment-shaped material at positions staggered by a fixed track distance from position exposed by the first exposure laser beam.

The method can how be performed such that a first exposure laser beam 15 is reflected by a first mirror face 12a and impinges on and exposes the partial circumference of an arc segment-shaped material to be exposed 1 of 180 degrees cylinder coverage, and wherein a radial second exposure laser beam 16 of the second mirror face 12b also impinges on and exposes the alternate partial circumference of the arc segment-shaped material to be exposed 1 of 180 degrees cylinder coverage. The second exposure laser beam can expose the arc segment-shaped material at positions staggered by a fixed track distance from position exposed by the first exposure-laser beam.

Figure 3:
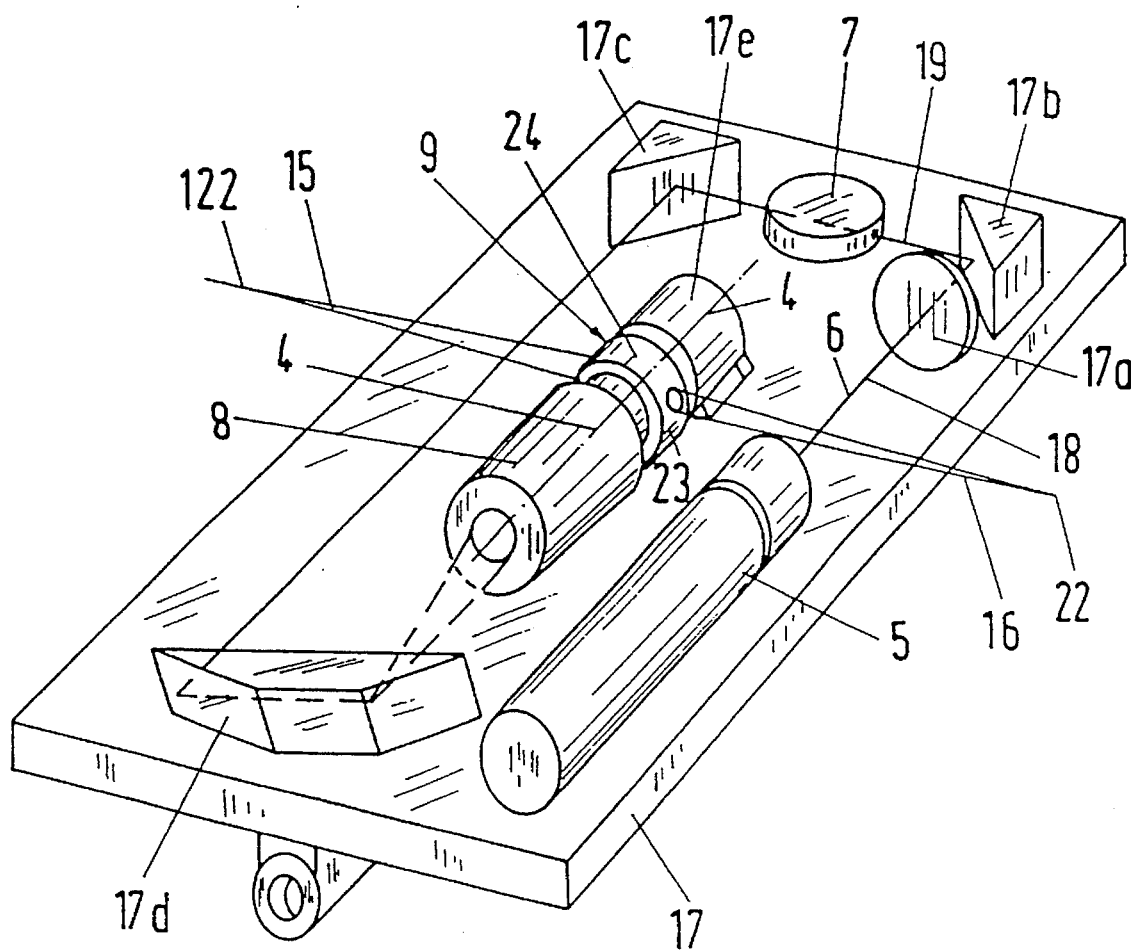
FIG. 3 is a perspective view onto a slider with a path of a laser beam, starting from a laser generator and passing through a laser modulator, a collimator, and a double mirror.

According to FIG. 3, a slider 17 is formed as a support for the laser generator 5. An optical axis 18 of the laser generator 5 coincides with the center longitudinal axis 4. The generated laser beam 6 is modulated in the laser modulator 7 and is deflected through the collimator 8 onto the rotatable first mirror face 12a and onto the rotatable second mirror face 12b. In each case, a focused exposure beam 15 or, respectively, 16, formed by the recited signals furnished point-by-point as exposure spots of about 6 through 15 microns diameter, is exposed on the material to be exposed 1, where the focused exposure beam 15, 16 comes from the mirror faces 12a and 12b.

The rotating mirror 9 with the two mirror faces 12a and 12b follows to the collimator 8 in the beam path 19. The two focusing optical systems 13 are disposed parallel to a reflection direction 20 and are disposed at an equal-sized radial distance 21 relative to the center longitudinal axis 4, and in fact such that the focal point 22 for each one of the two focusing optical systems 13 is located on the surface 1a of the material to be exposed 1. Track distances of a few microns can be separately exposed and resolved on the material to be exposed 1 based on a structure where each one of the mirror faces 12a and 12b forms an angle 11 of 45 degrees relative to the center longitudinal axis 4 and based on a geometry where the two mirror faces 12a and 12b are staggered by an angle of 180 degrees relative to the center longitudinal axis 4.

A very precise exposure is performed for row next to row on the material to be exposed 1 based on the advance of the slider 17 carrying a gray filter 17a, a first deflection mirror 17b, a second deflection mirror 17c, and a third reflection mirror 17d while the rotating speed of the mirror faces 12a, 12b driven by a motor 17e around the center longitudinal axis 4 remains the same.

A correction or a desired adjustment as well as a desired slot distance, which can be superposed onto the advance speed of the motor 17e, results by employing a structure where the rotatable mirror 9, furnished with the mirror faces 12a and 12b, is connected to a support 23. The support 23 forms outer rings 24 and 25 for the receiving of the radially uniformly spaced two focusing optical systems 13, as shown in FIG. 2, i.e. the two focusing systems 13 have equal distance from the center longitudinal axis 4. The outer rings 24 and 25 of the support 23 support the two focusing optical systems 13 and are slidable relative to each other without play in an axial direction and parallel to the center longitudinal axis 4 in a region of length sensitivity of a few microns and are set, congruent and identical positions as drawn such that according to FIG. 2 only the advance speed of the slider 17 becomes effective for the position of the focal point 22. The rotating speed of the motor 17e can be 10,000 rpm and higher.

The embodiment of FIG. 3 requires that the two mirror faces 12a, 12b are positioned fairly precise with the intersection line of the two mirror faces disposed perpendicular onto the center longitudinal axis.

Figure 4:
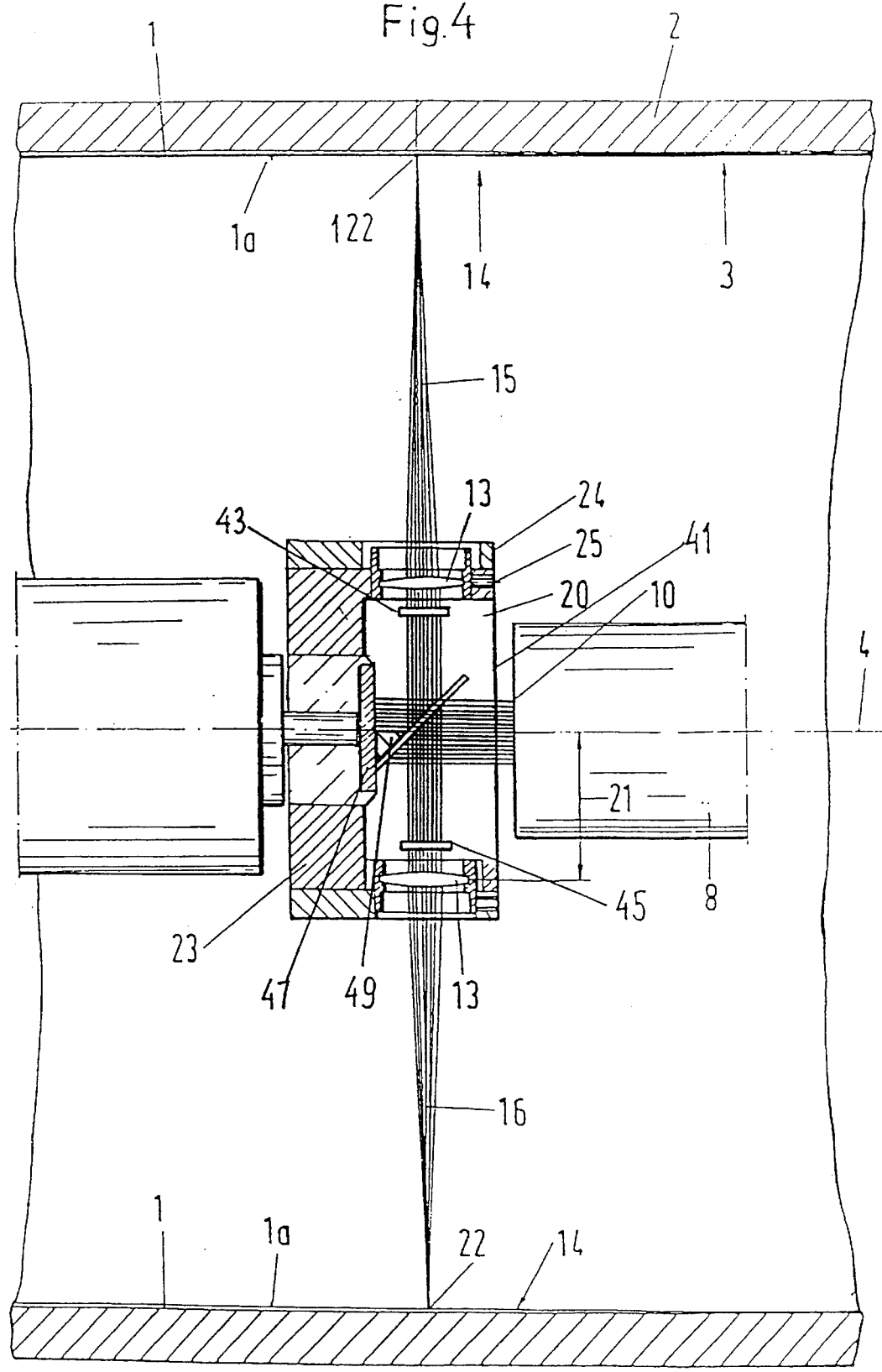
FIG. 4 is an axial longitudinal sectional view through a circular arc-shaped casing with an inserted material to be exposed employing a semipermeable plate for splitting the laser beam in an alternative embodiment relative to the embodiment of FIG. 2.

FIG. 4 provides an alternative embodiment, as compared to the embodiment of FIG. 2, employing a semi-permeable mirror 41, which reflects part of the light in the direction of a first exposure spot 22, instead of the two mirror faces 12a and 12b of FIG. 2. Another part of the laser light is passed through the semi-permeable mirror 41 and impinges onto the reflection mirror 47. The reflection mirror 47 is, in general, a planar mirror disposed perpendicular to the center longitudinal axis 4 for reflecting the parallel beam 10 into a direction completely opposite to the direction of parallel beam 10. The light reflected from the reflection mirror 47 then returns to the semi-permeable mirror 41 and is reflected from the semi-permeable mirror 41 in the direction of a second exposure spot 122.

The semi-permeable mirror 41 does not require that any precise position be aligned on the center median axis 4, since a a subdividing center line as present between the first mirror face and the second mirror face of FIG. 2 is not necessary in view of the different optical construction. Furthermore, an adjustment mechanism 49 is provided which allows a rotation of the semi-permeable mirror 41 relative to the axis. This allows to adjust the mirror to a position, where the exposure spot 22 and 122 are aligned such that they precisely provide the track distance of the desired tracks on the exposed material.

While FIG. 3 shows a laser beam modulator 7 to be disposed prior to entering the collimator 8, it can be advantageous to provide laser modulators 43 and 45, which are mounted on the rotating mirror assembly and which modulate the individual beams as shown in FIG. 4. Such arrangement allows to control the exposure on the two opposite sides of the rotating mirror separately and individually. If the modulators 43 and 45 are provided, then the laser beam modulator 7 can be dispensed with.

The laser modulators 43, 45 are preferably electrooptical modulators. The considerations involved in the electrooptical modulation of light are described for example in the textbook Quantum Electronics by Amnon Yariv, publishers John Wiley and Sons. Inc. New York 1967, chapter 19, pages 310 through 327. The reference shows the various principles which have been employed in electrooptical modulation of light beams. In general, the electrooptical modulator will include an input polarizer, a modulation cell, and an output polarizer. If the laser beam is polarized, of course an input polarizer can be dispensed with in the structure in the modulator of FIG. 4. However, if the apparatus is rotating and the laser beam is entering along the central median axis, then the polarization of the incoming laser beam will change with the rotation of the mirror assembly. Thus, the electrooptical modulators 43 and 45, in general, will require an input polarizer. The size of the modulation will depend on the modulating material and the electric voltage applied. The modulation can occur by transverse mode of electrooptic modulation, by electrooptic phase modulation, or by modulation employing the quadratic electrooptic effect. Preferred materials for providing such modulation include electrooptical modulators based on alkali niobates and alakali tanatalates and their mixed crystals.

Figure 5:
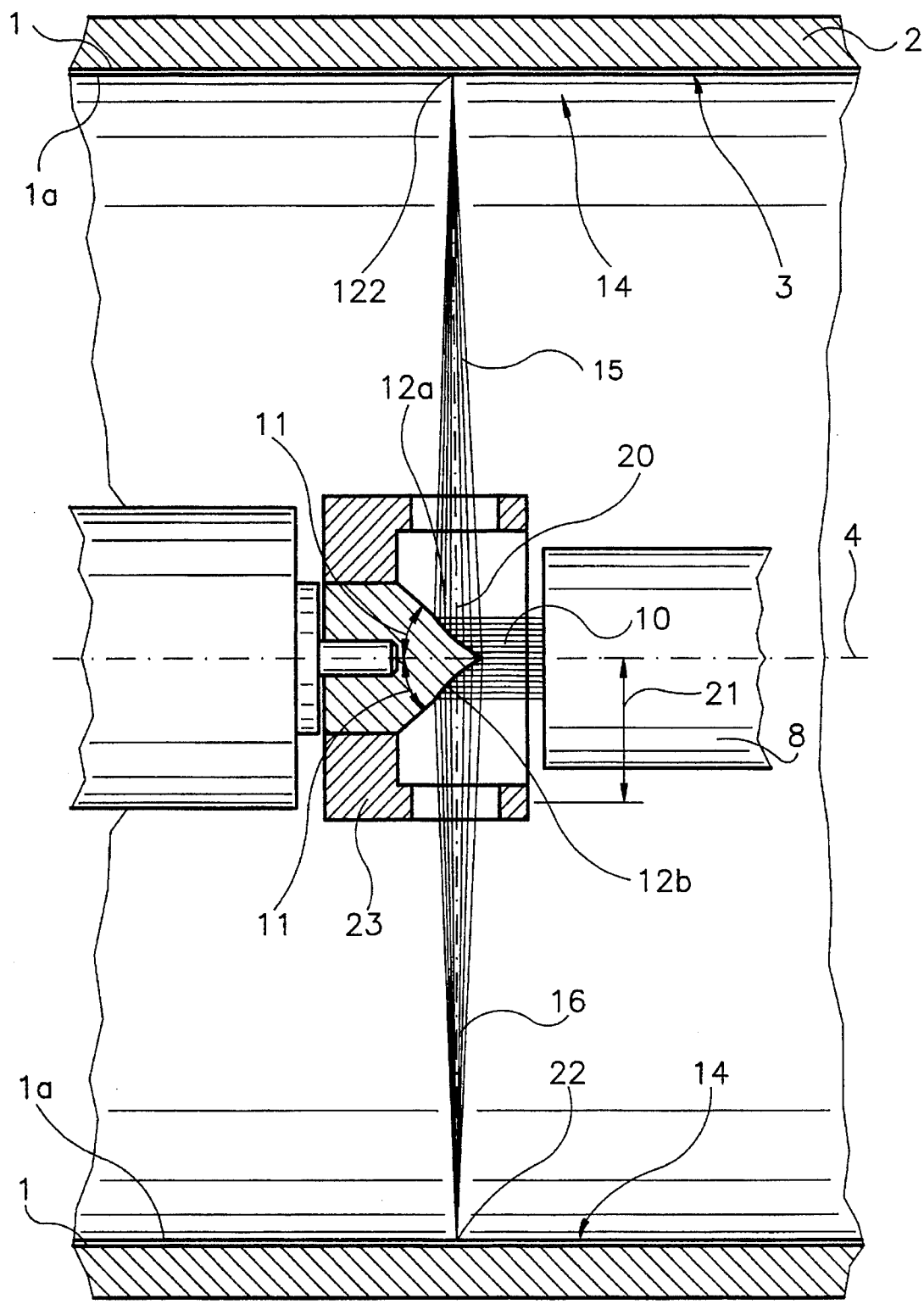
FIG. 5 is an axial longitudinal sectional view through a circular arc-shaped casing with an inserted material to be exposed similar to the embodiment of FIG. 2, however employing two parabolic mirrors serving simultaneously for beam splitting and collimation.

FIG. 5 provides an alternative embodiment as compared to the embodiment of FIG. 2 and employs parabolic shaped mirrors disposed such that a focal point is located on the material to be exposed 1. This construction combined the optical capabilities of the mirror surfaces 12a, 12b and of the two focusing optical systems 13 into a single substantially parabolically shaped mirror element 112a, 112b performing an equivalent function as compared to the elements employed according to FIG. 2. This structure can provide that only the parabolic mirror faces 112a. 112b have to be oriented and aligned and not a dual element system comprising a mirror and a collimating lens. Furthermore, any reflection and scattering losses occurring in a collimating system are avoided.

It will be understood that each of the elements described above, or two or more together, may also find a useful application in other types of methods and processing devices for light-sensitive material differing from the types described above.

While the invention has been illustrated and described as embodied in the method and apparatus for the exposing of light sensitive material to be exposed, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method for exposing a photo-sensitive material to be exposed comprising placing the photosensitive material to be exposed into a casing defining an inner circular arc-shaped cylinder and sealed against entry of light from external light sources, wherein the material to be exposed is disposed in the circular arc-shaped cylinder and is thereby disposed at a uniform spacing from a center longitudinal axis of the arc-shaped cylinder;

generating a laser beam with a laser generator;

modulating the laser beam in a laser modulator;

deflecting the modulated laser beam into a collimator;

directing the collimated laser beam, aligned parallel to the center longitudinal axis, onto a rotatable mirror having two mirror faces, wherein each one of the two mirror faces is disposed at an angle relative to the center longitudinal axis; focusing a laser beam reflected on one of the mirror faces with an optical system;

directing the focused laser beam radially onto a focusing surface, where focal points of the reflected and focused laser beam are rotary circulating on the surface of the material to be exposed;

exposing the material to be exposed with signals, providing point-shaped exposure spots on the material to be exposed, with the laser beam coming from the rotatable mirror and from the optical system.

2. The method according to claim 1, further comprising directing the parallel aligned light beams derived from the collimator onto a respective one of the two mirror faces, wherein the two mirror faces are positioned at an angle of substantially 45 degrees relative to the center longitudinal axis, and wherein one of the two mirror faces forms an angle of 90 degrees relative to a second one of the two mirror faces.

3. The method according to claim 1, wherein a first radial exposure beam, derived from a first mirror face of the two mirror faces, exposes the arc-segment shaped material to be exposed along a first partial circumference covering an angle of 180 degrees, and wherein a second radial exposure beam, derived from a second mirror face of the two mirror faces, exposes the arc-segment shaped material to be exposed along a second circumference covering an angle of 180 degrees, and whereby the arc-segment shaped material to be exposed on the first partial circumference is exposed staggered by a fixed track distance relative to the arc-segment shaped material to be exposed on the second partial circumference.

4. A method for exposing a photo-sensitive material to be exposed comprising placing the photosensitive material to be exposed into a casing defining an inner circular arc-shaped cylinder and sealed against entry of light from external light sources, wherein the material to be exposed is disposed in the circular arc-shaped cylinder and is thereby disposed at a uniform spacing from a center longitudinal axis of the arc-shaped cylinder;

generating a laser beam with a laser generator;

modulating the laser beam in a laser modulator;

deflecting the modulated laser beam into a collimator;

directing the collimated laser beam, aligned parallel to the center longitudinal axis, onto a rotating beam splitting, deflecting and focusing structure for directing a first split, reflected and focused laser beam radially onto a focusing surface, wherein a focal point of the first split, reflected and focused laser beam is rotary circulating on the surface of the material to be exposed and for directing a second split, reflected and focused laser beam radially onto the focusing surface, wherein a focal point of the second split, reflected and focused laser beam is rotary circulating on the surface of the material to be exposed;

exposing the material to be exposed with signals providing point-shaped exposure spots on the material to be exposed with the first split, reflected and focused laser beam and with the second split, reflected and focused laser beam.

5. The method according to claim 4, wherein the rotating beam splitting, deflecting and focusing structure is provided by two rotatable mirror faces, wherein each one of the two mirror faces is disposed at an angle relative to the center longitudinal axis, and wherein the collimated laser beam is reflected into a first reflected laser beam and a second reflected laser beam, and wherein the first reflected laser beam is focused with a first optical system, and wherein the second reflected laser beam is focused with a second optical system.

6. The method according to claim 4, wherein the rotating beam splitting, deflecting and focusing structure is provided by a first rotatable mirror face having a substantially parabolic surface and by a second rotatable mirror face having a substantially parabolic surface, wherein the first mirror face is disposed such that a first part of the collimated laser beam is reflected into a first reflected laser beam, and wherein the second parabolic mirror face is disposed such that a second part of the collimated laser beam is reflected into a second reflected laser beam, and wherein the first reflected laser beam is focused based on the parabolic surface onto the material to be exposed, and wherein the second reflected laser beam is focused based on the parabolic surface onto the material to be exposed.

7. The method according to claim 4, wherein the rotating beam splitting, deflecting and focusing structure is provided by a rotatable semipermeable mirror, wherein a face of the semipermeable mirror is disposed at an angle relative to the center longitudinal axis, and wherein the collimated laser beam is reflected by the semipermeable mirror into a first reflected laser beam, wherein a laser beam passed through by the semipermeable mirror is reflected by a planar mirror back to the semipermeable mirror, and where the semipermeable mirror reflects a substantial part of this back-reflected laser beam into a direction substantially opposite to that of the first reflected laser beam and thereby forms a second reflected laser beam, and wherein the first reflected laser beam is focused with a first optical system, and wherein the second reflected laser beam is focused with a second optical system.

8. A method for exposing a photo-sensitive material to be exposed (1) within a casing (2) sealed against entry of light from external light sources, wherein the material to be exposed (1) is disposed in a circular arc-shaped cylinder (3) disposed at a uniform spacing from a center longitudinal axis (4), wherein a laser generator (5) generates a laser beam (6), wherein the laser beam (6) is modulated through a laser modulator (7) and deflected into a collimator (8) and is directed onto a rotatable mirror (9) after exiting from the collimator (8), wherein the rotatable mirror (9) is disposed at an angle relative to the central longitudinal axis (4), and wherein the laser beam (6) coming from the rotatable mirror exposes signals providing point-shaped exposure spots on the material to be exposed (1), wherein the light beams (10), exiting aligned parallel to the center longitudinal axis (4) from the collimator (8), are deflected onto at least two mirror faces (12a, 12b), disposed at an angle (11) relative to the center longitudinal axis (4), wherein the parallel light beams (10) reflected onto the mirror faces (12a, 12b) are then the reflected light beams (20) focused in respective optical systems (13) and are directed radially onto the focusing plane (14), where the focal points of the reflected parallel beams are rotary circulating on the surface (1a) of the material to be exposed (1).

9. The method according to claim 8, wherein
the parallel aligned light beams (10) of the collimator (8) are directed onto the mirror faces (12a, 12b), which are arranged at an angle (11) of 45 degrees relative to the center longitudinal (4), and wherein the mirror faces (12a, 12b) form an angle of 90 degrees relative to each other.

10. The method according to claim 8, wherein
a first radial exposure beam (15) of the first mirror face (12a) exposes the arc-segment shaped material to be exposed (1) along a first partial circumference covering an angle of 180 degrees, and wherein a second radial exposure beam (16) of the second mirror face (12b) also exposes the arc-segment shaped material to be exposed (1) along a second circumference covering an angle of 180 degrees, and whereby the arc-segment shaped material to be exposed (1) on the first partial circumferences is exposed staggered by a fixed track distance relative to the arc-segment shaped material to be exposed on the second partial circumference.

11. A photocomposition apparatus comprising
a casing having an inner space defining a circular arc of a cylinder and a center longitudinal axis of the cylinder such that a photo-sensitive material to be exposed is positioned in said inner space to be exposed with a laser beam, and wherein the casing is sealed against external light;

a slider sliding in a direction parallel to the center longitudinal axis;

a laser generator supported by the cylinder, wherein the optical axis of the laser generator coincides with the center longitudinal axis;

a laser modulator disposed in a path of a laser beam generated by the laser generator for modulating the generated laser beam;

a collimator disposed in a path of the modulated laser beam for collimating the laser beam into a parallel beam;

a rotatable mirror with two mirror faces disposed in a path of the collimated laser beam for forming a first reflected laser beam and for forming a second reflected laser beam;

a first focusing optical system aligned parallel to a reflection direction of the first reflected laser beam and disposed at a predetermined radial distance from the center longitudinal axis and allowing adjustment of a focusing point to a surface of the material to be exposed for forming a first radial exposure beam to be directed and focused onto the material to be exposed in the form of point-shaped signals for generating exposed spots on the material to be exposed;

a second focusing optical system aligned parallel to a reflection direction of the second reflected laser beam and disposed at a predetermined radial distance from the center longitudinal axis and allowing adjustment of a focusing point to a surface of the material to be exposed for forming a second radial exposure beam to be directed and focused onto the material to be exposed in the form of point-shaped signals for generating exposed spots on the material to be exposed.

12. The apparatus according to claim 11, wherein
each of the two mirror faces forms an angle of substantially 45 degrees relative to the center longitudinal axis, and wherein the two mirror faces are staggered by an angle of substantially 180 degrees around the circumference.

13. The apparatus according to claim 11, further comprising
a support, wherein the rotatable mirror furnished with the two mirror faces is connected to the support, and wherein the support forms outer rings for receiving the first focusing optical system and the second focusing optical system, focusing each in a radial direction, and wherein the first focusing optical system and the second focusing optical system are disposed at equal-sized distances from the center longitudinal axis.

14. The apparatus according to claim 13, wherein
the outer rings of the support, and thereby the first focusing optical system and the second focusing optical system, slide and have their relative position adjusted in a direction parallel to the center longitudinal axis without play with a precision of a micrometer.

15. A photocomposition apparatus comprising
a casing having an inner space defining a circular arc of a cylinder and a center longitudinal axis of the cylinder such that a photo-sensitive material to be exposed is positioned in said inner space to be exposed with a laser beam, and wherein the casing is sealed against external light;

a slider sliding in a direction of the center longitudinal axis;

a laser generator supported by the cylinder, wherein an optical axis of the laser generator coincides with the center longitudinal axis;

a laser modulator disposed in a path of a laser beam generated by the laser generator for modulating the generated laser beam;

a collimator disposed in a path of the modulated laser beam for collimating the laser beam into a parallel beam;

a rotating beam splitting, reflecting, adjustment and focusing means for forming a first radial exposure beam to be directed and focused onto the material to be exposed in the form of point-shaped signals for generating exposed spots on the material to be exposed, and for forming a second radial exposure beam to be directed and focused onto the material to be exposed in the form of point-shaped signals for generating exposed spots on the material to be exposed.

16. The apparatus according to claim 15, wherein the rotating beam splitting, reflecting, adjustment and focusing means is furnished by a rotatable mirror with two mirror faces disposed in a path of the collimated laser beam for forming a first reflected laser beam and for forming a second reflected laser beam;

by a first focusing optical system aligned parallel to a reflection direction of the first reflected laser beam and disposed at a predetermined radial distance from the center longitudinal axis to adjust a focusing point to a surface of the material to be exposed; and by a second focusing optical system aligned parallel to a reflection direction of the second reflected laser beam and disposed at a predetermined radial distance from the center longitudinal axis to adjust a focusing point to a surface of the material to be exposed.

17. The apparatus according to claim 15, wherein the rotating beam splitting, reflecting, adjustment and focusing means is furnished by a rotatable mirror with two mirror faces each having a parabolic surface and each disposed in a path of the collimated laser beam for forming a first reflected and focused laser beam and for forming a second reflected and focused laser beam and to adjust the two mirror faces individually to a respective focusing point on a surface of the material to be exposed.

18. The apparatus according to claim 15, wherein the rotating beam splitting, reflecting, adjustment and focusing means is furnished by a rotatable semipermeable mirror disposed in a path of the collimated laser beam for forming a first reflected laser beam and for forming a transmitted laser beam;

by a planar mirror reflecting the transmitted laser beam in a direction opposite to that of the transmitted laser beam for being reflected at the rotatable semipermeable mirror and thereby for forming a second reflected laser beam;

by a first focusing optical system aligned parallel to a reflection direction of the first reflected laser beam and disposed at a predetermined radial distance from the center longitudinal axis and allowing adjustment of a focusing point to a surface of the material to be exposed; and by a second focusing optical system aligned parallel to a reflection direction of the second reflected laser beam and disposed at a predetermined radial distance from the center longitudinal axis and allowing adjustment of a focusing point to a surface of the material to be exposed.

19. A photocomposition apparatus, including an inner space of the photocomposition apparatus shaped like a circular arc and sealed against light, and wherein a photosensitive material to be exposed (1) is exposed in said inner space with a laser beam (6), wherein a slider (17), sliding in a direction of the center longitudinal axis (4), supports a laser generator (5), wherein the optical axis (18) of the laser generator (5) coincides with the center longitudinal axis (4), wherein the generated laser beam (6) is modulated in a laser modulator (7), and wherein the laser beam (6) is passed through a collimator (8) onto two rotatable mirrors (9), wherein two radial exposure beams, directed focused onto the material to be exposed (1), emanate from the rotatable mirror (9) in the form of point-shaped signals as exposure spots, wherein a rotatable mirror (9) with at least two mirror faces (12a, 12b) is disposed in the beam path (19) following to the collimator (8), wherein a focusing optical system (13) is aligned parallel to the reflection direction of the reflected light beam (20) of the respective mirror face (12a, 12b) disposed at a predetermined radial distance (21) from the center longitudinal axis (4), and wherein the focusing point (22) in each case is adjustable to the surface level (1a) of the material to be exposed (1).

20. The apparatus according to claim 19, wherein each of the mirror faces (12a, 12b) forms an angle (11) of 45 degrees relative to the center longitudinal axis (4), and wherein the two mirror faces (12a, 12b) are staggered by an angle of 180 degrees along the circumference.

21. The apparatus according to claim 19, wherein the rotatable mirror (9), furnished with several mirror faces (12a, 12b) is connected to a support (23), wherein the support (23) forms outer rings (24, 25) for receiving the radially focusing optical systems (13), and wherein the focusing optical systems are disposed at equal-sized distances from the center longitudinal axis (4).

22. The apparatus according to claim 21, wherein the outer rings (24, 25) of the support (23) and thereby the focusing optical systems (13) slide and and have their relative position adjusted in a direction parallel to the center longitudinal axis (4) with a precision of a micrometer.

23. The method according to claim 1, further comprising adjusting the optical system for obtaining focal points on the focusing surface.

* * * * *